United States Patent

Ohbe et al.

(10) Patent No.: US 6,656,578 B2
(45) Date of Patent: Dec. 2, 2003

(54) PROCESS FOR PRODUCING AROMATIC LIQUID CRYSTALLINE POLYESTER AND FILM THEREOF

(75) Inventors: Yoshitaka Ohbe, Tsukuba (JP); Kazunori Akiyoshi, Niihama (JP); Shino Moriyama, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/238,597

(22) Filed: Sep. 11, 2002

(65) Prior Publication Data

US 2003/0088053 A1 May 8, 2003

Related U.S. Application Data

(63) Continuation of application No. 09/649,061, filed on Aug. 29, 2000, now Pat. No. 6,528,164.

(30) Foreign Application Priority Data

Sep. 3, 1999 (JP) ............................................. 11-249863
Sep. 17, 1999 (JP) ............................................. 11-263934
Nov. 2, 1999 (JP) ............................................. 11-312273

(51) Int. Cl.⁷ ............................................. B32B 15/02
(52) U.S. Cl. ...................... 428/221; 528/298; 528/308; 528/361; 428/402
(58) Field of Search ................................. 528/298, 308, 528/361; 428/402, 221

(56) References Cited

U.S. PATENT DOCUMENTS

| | | |
|---|---|---|
| 4,161,470 A | 7/1979 | Calundann |
| 4,333,907 A | 6/1982 | Urasaki et al. |
| 4,975,312 A | 12/1990 | Lusignea et al. |
| 5,015,723 A | 5/1991 | Sugimoto et al. |
| 5,053,481 A | 10/1991 | Ishii et al. |
| 5,055,546 A | 10/1991 | Sugimoto et al. |
| 5,534,209 A | 7/1996 | Moriya |
| 5,750,219 A | 5/1998 | Harada et al. |
| 5,891,532 A | 4/1999 | Furuta et al. |
| 5,900,292 A | 5/1999 | Moriya |

FOREIGN PATENT DOCUMENTS

| | | |
|---|---|---|
| EP | 0 346 926 A | 12/1989 |
| EP | 0 747 415 A | 12/1996 |
| EP | 1 072 631 A | 1/2001 |
| JP | 61-102234 | 5/1986 |
| JP | 63-3888 | 1/1988 |
| JP | 63-33450 | 7/1988 |
| JP | 02-3430 | 1/1990 |
| JP | 02-69517 | 3/1990 |
| JP | 02-69518 | 3/1990 |
| JP | 06/53383 | 7/1994 |
| JP | 07-251438 | 10/1995 |
| JP | 07-323506 | 12/1995 |
| JP | 08/2974 | 1/1996 |
| JP | 08/92467 | 4/1996 |
| JP | 08/113631 | 5/1996 |
| JP | 08-192421 | 7/1996 |
| WO | WO 90/15706 | 12/1990 |

*Primary Examiner*—Samuel A. Acquah
(74) *Attorney, Agent, or Firm*—Sughrue Mion, PLLC

(57) ABSTRACT

Provided is a process for producing an aromatic liquid crystalline polyester comprising the steps of: charging 80 20 mol % of a compound represented by the following formula (I) and 20 to 80 mol % of a compound represented by the following formula (II) into a reaction vessel; conducting polycondensation reaction at a temperature from 270 to 350° C. to produce a aromatic liquid crystalline polyester; discharging the aromatic liquid crystalline polyester in a molten state from the reaction vessel and solidifying; then, pulverizing the solidified polyester into particles; and heat-treating at a temperature from 200 to 310° C.,

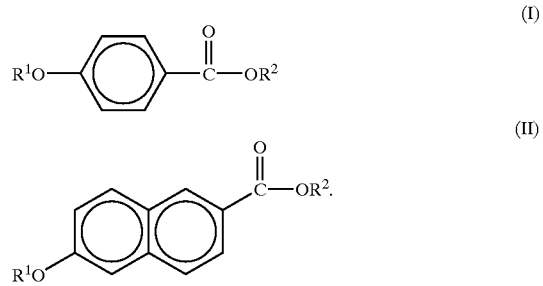

The aromatic liquid crystalline polyester has improved low temperature molding processability, and the film thereof has sufficient heat-resistance and excellent gas barrier properties.

11 Claims, No Drawings

PROCESS FOR PRODUCING AROMATIC LIQUID CRYSTALLINE POLYESTER AND FILM THEREOF

This is a continuation of Application Ser. No. 09/649,061 filed Aug. 29, 2000 U.S. Pat. No. 6,528,164, the disclosure of which is incorporated herein by reference.

BACKGROUND OF THE INVENTION

1. Field of the Invention

The present invention relates to an aromatic liquid crystalline polyester which is excellent in film molding property (film forming property) and is suitable for a film and a method for producing the same.

2. Description of the Related Art

Recently, films produced from various polymers are essential in daily life. For example, there have been developed a variety of films such as high strength films, high elasticity films, oxygen barrier films, conductive films, heat-resistant films, light shielding films and the like. Among other, oxygen barrier films or water vapor barrier films are widely used in our life as wrapping materials irrespective of industrial use or private use.

Conventionally, there have been developed, in this filed, stretched films of polyolefins such as polyethylene, polypropylene and the like, stretched films of polyethylene terephthalate (hereinafter, abbreviated as PET), polyvinylidene chloride (hereinafter, abbreviated as PVDC) films, saponified ethylene-vinyl acetate copolymer (hereinafter, abbreviated as EVOH) films and the like, and they are used as mono-layer or two or more multi-layer films depending on the object and use.

Multi-layer is often essential for maintaining gas barrier properties, and one of factors for raising production cost. Recently, in food wrapping field such as retort pouch and the like, wrapping treatment tends to be conducted at higher temperature for shorter time for effective sterilizing treatment and wrapping materials having high heat-resistance are required. Nowadays, PET films on which silica, alumina or the like is vapor-deposited and the like have been developed, however, problems remain regarding separation and burning of refuse to be solved in the future. Polyethylene naphthalate (hereinafter, abbreviated as PEN)-based wrapping materials (vessels) having improved heat-resistance of a PET film and oxygen barrier property have been developed, however, this gas barrier properties is insufficient for high gas barrier (oxygen permeability: 1 cc/m$^2$·24 hr·1 atm or less) use (for example, Japanese Patent Application Laid-Open (JP-A) Nos. 8-113631 and 8-92467).

Further, in the case of EVOH excellent in oxygen barrier property and poor in water vapor barrier property, polyolefin or the like excellent in water vapor barrier property is laminated to form a multi-layer film for imparting excellent water vapor barrier property to EVOH, however, problems still remains in heat-resistance.

In these fields, film resin materials excellent in water vapor barrier property and simultaneously excellent in oxygen barrier property (high gas barrier material) are desired for realizing low cost and heat-resistance in view of distribution at ordinary temperature in the future. As the material having oxygen barrier property and water vapor barrier property, liquid crystalline polymers, particularly, a thermotropic liquid crystal polyester (hereinafter, sometimes abbreviated as LCP) is noticed, and film forming from this polyester has been investigated. For example, there are reported films made of a liquid crystalline copolyester composed of PET/p-hydroxybenzoic acid (hereinafter, sometimes abbreviated as POB) having an aliphatic chain in the main chain (Japanese Patent Application Publication (JP-B) No. 8-2974) or made of a semi-aromatic liquid crystalline polyester (JP-B No. 6-53383), and films made of a wholly aromatic liquid crystalline polyester (JP-A Nos. 7-323506 and 7-251438), and the like. However, in these investigations, it is difficult to form thin films since molecular orientation occurs in flow direction (MD) which is characteristic of LCP and anisotropy in mechanical strength occurs against the transverse direction (TD), therefore, it is difficult to obtain a practical LCP-based thin film having a thickness of 50 μm or less.

Wholly aromatic LCPs often have a processing temperature of over 300° C., and heat-resistant wholly aromatic liquid crystalline polyesters having a temperature of deflection under load (TDUL) of over 250° C. sometimes require a further higher processing temperature of 350° C. or more, therefore, an expensive process machine having specific specification is necessary.

As film forming methods from a wholly aromatic polyester which forms an optically anisotropic melted material in melting, an blown film forming method and a film forming method using a T die method are disclosed, for example, in JP-B Nos. 62-58378 and 63-33450 and the like. However, any of these methods needs a processing temperature of 340° C. or more, and the processing temperature is still required to be improved.

For obtaining aromatic liquid crystalline polyesters, there are known a suspension polymerization method, interfacial polymerization method, solution polymerization method, bulk melt polymerization method and the like, however, the former three methods have problems regarding post-treatments, for example, removal of solvents, washing of a polymer and drain load. Though bulk polymerization is preferable in economical point of view, the equilibrium constant of polycondensation reaction of a polyester is lower as compared with a polyamide, therefore, for progressing the polycondensation reaction, it is necessary to adopt a method for removing by-products by raising the reaction temperature or conducting the reaction under reduced pressure.

In the polymerization combined with a reduced pressure polymerization process, when the molecular weight is increased to show desired melt tension, in view of melt viscosity at polymer discharging, problems sometimes occur such as the difficulty of successive discharging of polymers or the contamination by retained polymers heat-treated at a high temperature in the polymerization vessel or at the discharging portion.

In case of aromatic liquid crystalline polyesters having comparatively low melt viscosity, the reaction is often conducted at a reduced pressure in later stage, and it is difficult to obtain a resin polymerized into high molecular weight in a stable state, thus discharging method has been proposed. (JP-A No. 8-192421).

Further, compounds having low boiling point produced in polymerization and unreacted raw materials remain in an aromatic liquid crystalline polyester, evaporate in molding to pollute environments, gradually migrate from the molder article to destruct product mechanism, and when foaming occurs in blown film forming, it disturbs formation of bubble and makes film formation difficult.

The present inventors have disclosed, for producing a heat-resistant polyester, a method in which a polyester is melt-polycondensed then taken out in a molten state (JP-A No. 2-69517) and a method for producing an aromatic polyester by combining this method and solid phase polymerization (JP-A No. 2-69518).

A wholly aromatic liquid crystalline polyester which has a sufficient molecular weight for manifesting suitable mechanical strength and can be molded at a lower temperature (320° C. or lower) is disclosed in JP-B No. 63-3888 and a semi-aromatic liquid crystalline polyester is disclosed in JP-A No. 61-102234 and the like. As film forming methods using this, a method for forming blown film at high shear rate is described in JP-A No. 2-3430, a film forming method using a ring die and the like is described in U.S. Pat. No. 4,975,312 and WO 9015706. Any of them discloses a method for relaxing anisotropy specific to a liquid polyester by a special molding method. In view of cost performance, decrease in thickness of 25 μm or less, preferably 15 μm or less is required, since an expensive monomer, 6-hydroxy-2-naphtoic acid is used. JP-A No. 2-3430 describes that melt strength measured under constant conditions as one of technical factors revealing important indication in blow molding film formation at a high shear rate, and exemplifies a film having a thickness of 16 μm to 22 μm. However, there still remains a problem to produce a thin thickness film.

The object of the present invention is to provide a process for producing an aromatic liquid crystalline polyester having a sufficient strength as wrapping material as well as low temperature processibility, and the aromatic liquid crystalline polyester obtainable by the process.

SUMMARY OF THE INVENTION

The present inventors have been intensively studied a process for producing an aromatic liquid crystalline polyester comprising two or more of aromatic hydroxycarboxylic acid units, and increasing the molecular weight thereof, and have found a process where an aromatic liquid crystalline polyester having high molecular weight can be produced stably comparing with a conventional process, and the temperature dependency upon melt viscosity of the resin can be made small, and the melt tension (hereinafter, abbreviated as MT) can be raised by the molecular weight increasing, and have completed the present invention.

Namely, the present invention relates to:
[1] A process for producing an aromatic liquid crystalline polyester comprising the steps of: charging 80 to 20 mol % of a compound represented by the following formula (I) and 20 to 80 mol % of a compound represented by the following formula (II) into a reaction vessel; conducting polycondensation reaction of the charged mixture at a temperature from 270 to 350° C. to produce an aromatic liquid crystalline polyester having a flow temperature of 210° C. or more and lower than the polycondensation reaction temperature by 30° C. or more; discharging the aromatic liquid crystalline polyester in a molten state from the reaction vessel and solidifying; then, pulverizing the solidified polyester into particles having a particle size of 3 mm or less; and heat-treating at a temperature from 200 to 310° C. still in the solid state under inert gas atmosphere,

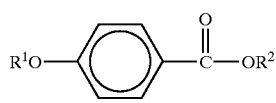

(I)

in the formula, $R^1$ represents a hydrogen atom, formyl group, acetyl group, propionyl group or benzoyl group, and $R^2$ represents a hydrogen atom, methyl group, ethyl group, propyl group, benzyl group or phenyl group,

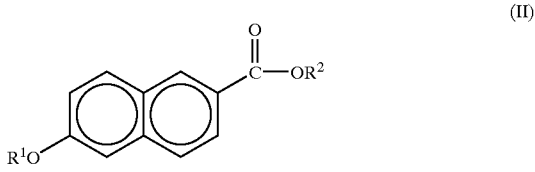

(II)

in the formula, $R^1$ and $R^2$ are the same with those defined in formula (I), $R^1$s in formulae (I) and (II) may be the same or different from each other, $R^2$s in formulae (I) and (II) may be the same or different from each other, and the flow temperature means a temperature (° C.) at which the melt viscosity measured by a capillary type rheometer is 48,000 poise when a resin which has been melted by heating at a temperature raising rate of 4° C./min is extruded through a nozzle having an internal diameter of 1 mm and a length of 10 mm under a load of 100 kgf/cm²;

[2] A process for producing an aromatic liquid crystalline polyester, wherein the heat-treated polyester of claim 1 is further heat-melted and granulated; and

[3] An aromatic liquid crystalline polyester prepared by a process according to the above [1] or [2], wherein the aromatic liquid crystalline polyester comprises 80 to 20 mol % of the following repeating unit (A) and 20 to 80 mol % of the following repeating unit (B):

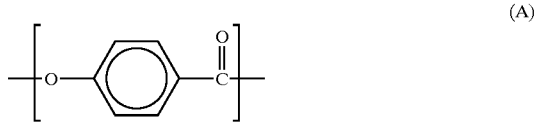

(A)

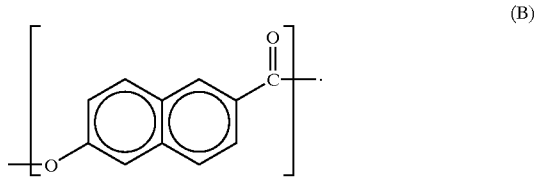

(B)

DETAILED DESCRIPTION OF THE INVENTION

The process for producing an aromatic liquid crystalline polyester of the present invention comprises the steps of: charging 80 to 20 mol % of a compound represented by the following formula (I) and 20 to 80 mol % of a compound represented by the following formula (II) into a reaction vessel; conducting polycondensation reaction of the charged mixture at a temperature from 270 to 350° C. to produce an aromatic liquid crystalline polyester having a flow temperature of 210° C. or more, preferably 220° C. or more, and lower than the polycondensation reaction temperature by 30° C. or more, preferably 35° C. or more; discharging the aromatic liquid crystalline polyester in a molten state from the reaction vessel and solidifying; then, pulverizing the solidified polyester into particles having a particle size of 3 mm or less; and heat-treating at a temperature from 200 to 310° C. still in the solid state under inert gas atmosphere,

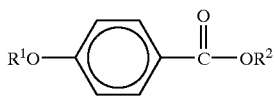

in the formula, $R^1$ represents a hydrogen atom, formyl group, acetyl group, propionyl group or benzoyl group, and $R^2$ represents a hydrogen atom, methyl group, ethyl group, propyl group, benzyl group or phenyl group,

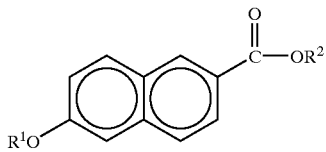

in the formula, $R^1$ and $R^2$ are the same with those defined in formula (I), $R^1$s in formulae (I) and (II) may be the same or different from each other, $R^2$s in formulae (I) and (II) may be the same or different from each other, and the flow temperature means a temperature (° C.) at which the melt viscosity measured by a capillary type rheometer is 48,000 poise when a resin which has been melted by heating at a temperature raising rate of 4° C./min is extruded through a nozzle having an internal diameter of 1 mm and a length of 10 mm under a load of 100 kgf/cm².

The heat-treating time in the solid state is preferably 1 to 24 hours.

The heat-treated polyester can be further heat-melted and granulated, preferably into pellets.

The compounds represented by the formula (I) include those whose benzene ring is substituted with halogen or alkyl group.

Examples of the compound represented by the formula (I) include 4-hydroxybenzoic acid, 4-formyloxy benzoic acid, 4-acetoxybenzoic acid, 4-propionyloxy benzoic acid, methyl 4-hydroxybenzoate, propyl 4-hydroxybenzoate, phenyl 4-hydroxybenzoate, benzyl 4-hydroxybenzoate, methyl 4-acetoxybenzoate, phenyl 4-acetoxybenzoate and the like, and in particular, 4-hydroxybenzoic acid or 4-acetoxybenzoic acid is preferable.

Nuclear substituted compounds represented by the formula (I) such as 2-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, and acetylated compounds thereof, can be used together in order to improve gas barrier property.

The compounds represented by the formula (II) include those whose naphthalene ring is substituted with halogen or alkyl group.

Examples of the compound represented by the formula (II) include 6-hydroxy-2-naphthoic acid, 6-acetoxy-2-naphthoic acid, methyl 6-hydroxy-2-naphthoate, phenyl 6-hydroxy-2-naphthoate, or methyl 6-hydroxy-2-naphthoate and the like, and in particular, 6-hydroxy-2-naphthoic acid or 6-acetoxy-2-naphthoic acid is preferable.

Nuclear substituted compounds represented by the formula (II) such as 6-hydroxy-5-chloro-2-naphthoic acid, 6-hydroxy-7-chloro-2-naphthoic acid, 6-hydroxy-4,7-dichloro-2-naphthoic acid, and acetylated compounds thereof, can be used together in order to improve gas barrier property.

In the present invention, 3-hydroxybenzoic acid, 3-formyloxy benzoic acid, 3-acetoxybenzoic acid, 3-propionyloxybenzoic acid, methyl 3-hydroxybenzoate, propyl 3-hydroxybenzoate, phenyl 3-hydroxybenzoate, benzyl 3-hydroxybenzoate, methyl 3-acetoxybenzoate, 4'-hydroxybiphenyl-4-carboxylic acid, 4'-acetoxybiphenyl-4-carboxylic acid, and the like can be used together within the range which does not exert significant influence on physical properties and processability (film forming property) of the resulting aromatic liquid crystalline polyester.

In producing the aromatic liquid crystalline polyester of the present invention, first, a mixture composed of compounds represented by the formulae (I) and (II) is polycondensed in a reaction vessel, and charging mode of such a mixture into the polymerization vessel may be bulk-wise or batch-wise.

When a compound having a phenolic hydroxy group is used as the compound represented by the formula (I) or (II), it is preferable that reaction which converts such a compound into a compound which is easily polycondensed (for example, esterification reaction using an acid anhydride such as acetic anhydride and the like) is conducted, prior to the polycondensation reaction, in a reaction vessel different from that used for the polycondensation reaction or in the same reaction vessel as that used for the polycondensation reaction, then, the polycondensation reaction is conducted subsequently. When a compound having a phenolic hydroxy group is used as the compound represented by the formula (I) or (II), it is more preferable that an acid anhydride such as acetic anhydride and the like in an amount of equivalent of more (preferably, 1.1 to 1.3-fold equivalent) of the phenolic hydroxy group is charged into a reaction vessel together with a mixture composed of the compounds represented by the formula (I) and (II), esterification reaction is conducted, then, polycondensation reaction is conducted. As a reaction vessel for acetylation, corrosion resistant materials such as titan, Hastelloy B, and the like, can be used. Moreover, polyester is required to have a good hue (L value), it is preferable to use a glass lining sus reactor, and the like.

The reaction can be conducted under atmosphere of an inert gas, for example, nitrogen, at normal pressure, reduced pressure or combination thereof, preferably, under atmosphere of an inert gas at normal pressure.

As the process, a batch-wise process, a continuous process or combination thereof can be adopted.

The temperature of the polycondensation reaction in the present invention is from 270 to 350° C., and preferably from 280 to 330° C. When the reaction temperature is lower than 270° C., progress of the reaction is slow, and when over 350° C., sub-reactions such as decomposition and the like tend to occur.

When the reaction vessel contains multi-stages or partitioned, reaction temperature of the last part corresponds to the polycondensation temperature referred to in the present invention.

The time of the polycondensation reaction should be appropriately determined depending on the reaction conditions, and preferably it is from 0.5 to 5 hours in the above-described reaction temperature.

Multi-stage reaction temperature may also be adopted, and if necessary, it is possible that an aromatic liquid crystalline polyester as the reaction product is discharged in molten state during the reaction or immediately after reaching to the maximum temperature.

While the melt-polycondensation reaction usually progresses sufficiently even under no-catalyst, if necessary, compounds such as oxides, acetates and the like of Ge, Sn, Ti, Sb, Co, Mn and the like can also be used. In the case of food wrapping films, removal of a catalyst component may be necessary, accordingly, non-catalyst is preferable.

Known types of reaction vessels can be used. In the case of a vertical reaction vessel, multi-stage paddle blades, turbine blades, double helical blades are preferable, and in the case of a horizontal reaction vessel, those in which blades of various forms, for example, lens-shaped blades, glasses blades, multi-circular flat blades and the like are mounted perpendicular to single or twin stirring axes are advantageous.

Heating of the reaction vessel is conducted by heat medium, gas or electric heater, and it is preferable that stirring axis, blades, baffle plate and the like are also heated for uniform heating.

In such a method for producing an aromatic liquid crystalline polyester, it is important that the flow temperature of an aromatic liquid crystalline polyester obtained by polycondensation reaction is 210° C. or more and lower than the polycondensation reaction temperature by 30° C. or more. Further preferably, it is preferable that the flow temperature of the resulting aromatic liquid crystalline polyester is 220° C. or more and lower than the polycondensation reaction temperature by 35° C. or more. When the flow temperature is less than 210° C., the molecular weight of an aromatic liquid crystalline polyester is not sufficient, and there are problems regarding molding processing and physical properties. Even if post treatments such as solid phase polymerization and the like are conducted, melt-adhesion of aromatic liquid crystalline polyesters occurs and a large amount of by-products are produced, also leading to economical disadvantage. When the flow temperature is near the polycondensation reaction temperature, viscosity of a polyester increases and recovery thereof becomes difficult, and in addition, stirring and mixing property also deteriorates, and uneven heating may exerts reverse influence on heat-stability of the polymer.

Further, from the industrial standpoint, continuous use of a polymerization vessel is advantageous since in batch-wise polymerization, washing of polymerization vessels increases cost, and melt-discharging conditions are particularly important. For washing reaction vessels, there are washing methods using glycols and/or amines described in JP-A Nos. 5-29592 and 5-29593.

When the aromatic liquid crystalline polyester is discharged in a molten state, it is preferable to conducted the discharging under atmosphere of an inert gas, for example, nitrogen from the standpoint of tone of the resulting polymer, however, it may be conducted in air when moisture content is low. In order to control the flow temperature of the polymer at discharging, the discharging is preferably conducted under inert gas atmosphere or pressurized atmosphere by inert gas such as nitrogen preferably at 0.1–2 kg/cm²G, more preferably at 0.2–1 kg/cm²G.

As the mechanism for discharging the aromatic liquid crystalline polyester of the present invention in a molten state, known extruders, gear pumps are listed, and a merely valve may also be sufficient. Since the discharged resin is solidified after somewhile, therefore, the resin can be cut by a strand cutter and a sheet cutter, and can be pulverized according to the object. For treating a large amount of resins in short time, there are listed a method in which the resin is passed through a constant feeding apparatus and cooled by a double belt cooler as described in JP-A No. 6-256485 by the present applicant, as well as other methods.

Though the aromatic liquid crystalline polyester recovered in a molten state may sometimes be used as it is, it is preferable to carry out solid phase polymerization in view of increase in molecular weight leading to increase in physical properties.

It is preferable that the resulted aromatic liquid crystalline polyester is pulverized by a known grinder into a particle (powder) having an average particle size (according to Rosin-Rammlar method) of 3 mm or less, preferably 0.5 mm or less, further preferably from 0.1 to 0.4 mm, and solid phase polymerization is conducted in which the particle is subjected to heat treatment under inert gas atmosphere in a solid state.

When the particle size is 3 mm or more, polymerization rates and diffusion times of by-products resulted from reaction of unreacted raw materials differ between surface layers and inner portions, consequently spreading of molecular weight distribution and removal of materials to be removed can not be conducted satisfactory, sometimes leading to foaming and gas generation, therefore, such a particle size is not preferable.

It is necessary to select temperature raising rate and maximum treating temperature in the solid state polymerization so that aromatic liquid crystalline polyester particles are not melt-adhered. When melt-adhesion occurs, surface area decreases, and polycondensation reaction and removal of components having lower boiling point are delayed. Regarding the maximum treating temperature in the solid state polymerization, it is effective to conduct treatment at a temperature in the range from 200 to 310° C., preferably 210 to 310° C., more preferably from 230 to 300° C. without causing melt-adhesion under inert gas atmosphere. At a temperature below 200° C., the reaction is slow and treating time is uneconomically longer, and the treating temperature of 310° C. or more is not preferable since then powder particles are mutually melt-adhered or melted and solid phase condition can not be kept.

In the solid state polymerization, a known drier, reaction apparatus, mixer, electric furnace and the like can be used, and a gas flow type apparatus having high closure is preferable in view of the above-described conditions.

The inert gas is preferably selected from nitrogen, helium, argon, carbon dioxide, and nitrogen is further preferable.

The flow rate of the inert gas is determined with considering the capacity of the polymerization vessel, particle diameter and filled state of the powder, to be 2 m³/hr to 8 m³/hr per 1 m³ of the solid state polymerization vessel, preferably 3 m³/hr to 6 m³/hr. When the flow rate is less than 2 m³/hr, polymerization rate is too slow, and when the flow rate is more than 8 m³/hr, the powder may be dispersed off.

The aromatic liquid crystalline polyester prepared according to the process of the present invention comprises 80 to 20 mol % of the following repeating unit (A) and 20 to 80 mol % of the following repeating unit (B):

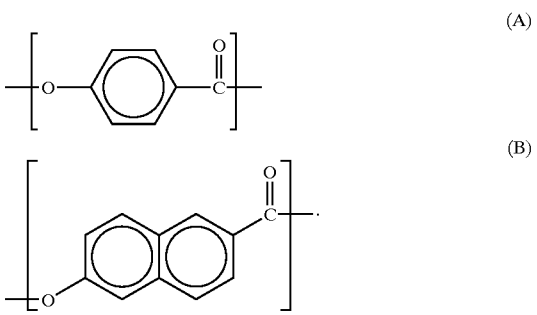

In the aromatic liquid crystalline polyester of the present invention, when the amount of the above repeating unit (A)

is more than 80 mol %, unmeltable portion increases to cause bad melt processability. When the amount is less than 20 mol %, then the amount of the repeating unit (B) is more than 80 mol %, the processing temperature becomes more than 320° C., and it is not preferable in processability. In the range of the present invention, low temperature molding (film forming) can be performed, especially, thin films having a thickness of 20 μm or less, which is excellent in oxygen barrier property and water vapor barrier property can be obtained. The aromatic liquid crystalline polyester shows good balance of physical properties and processabilty.

It is preferable that the aromatic liquid crystalline polyester of the present invention has a logarithmic viscosity (ηinh) defined by the following formula of 4.0 dl/g or more, a flow temperature of 320° C. or less, and a melt tension measured at a temperature higher than the flow temperature by 25° C. or more of 3.0 g or more.

The aromatic liquid crystalline polyester has characteristics of showing optical anisotropy in molten state, being excellent in melt-processability, chemical resistance, and mechanical properties.

$$\eta inh = (ln(\eta rel))/C$$

In the formula, ηrel is called relative viscosity and represents the ratio of falling time of a polymer solution to falling time of a solvent between given marked lines in a capillary. C represents the concentration of a polymer solution, and the unit thereof is g/dl. In the present invention, it is a value measured by an Ubbelohde viscometer using as a solvent 3,5-bis(trifluoromethyl)phenol at a polymer concentration of 0.1 g/dl and a temperature of 60° C. The logarithmic viscosity (ηinh) is preferably 6.0 dl/g or more, more preferably 8.0 dl/g or more, and further preferably 10.0 dl/g or more, in view of high melt tension. The logarithmic viscosity (ηinh) is preferably 20 dl/g or less, and more preferably 15 dl/g or less, in view of the precessability. When η inh is less than 4.0 dl/g, the melt tension is low and film forming property as well as mechanical strength are problematical.

The aromatic liquid crystalline polyester of the present invention has a flow temperature of 300° C. or less, preferably from 230 to 295° C., further preferably from 240 to 290° C. A flow temperature of over 320° C. is not preferable since then the processing temperature may exceed 350° C. and the object of the present invention is not attained.

Here, the flow temperature (hereinafter, sometimes abbreviated as "FT") means a temperature (° C.) at which the melt viscosity measured by a capillary type rheometer (for example, Koka Flow Tester CFT-500 manufactured by Shimadzu Corp.) is 48,000 poise when a resin which has been melted by heating at a temperature raising rate of 4° C./min is extruded through a nozzle having an internal diameter of 1 mm and a length of 10 mm under a load of 100 kgf/cm².

The aromatic liquid crystalline polyester of the present invention exhibits a melt tension (hereinafter, sometimes abbreviated as "MT") measured at a temperature higher than the flow temperature by 25° C. or more of 3.0 g or more, preferably 4.0 g or more, more preferably 6.0 g or more, further preferably 12.0 g or more, under conditions of an internal diameter of 2.1 mm and a length of 8 mm of a capillary and a piston rate of 5 mm/min. When the MT value is less than 3.0 g, blown film forming is difficult and frost line is unstable in many cases. In view of film forming property, temperature dependency of MT is preferably small.

In the aromatic liquid crystalline polyester of the present invention, it is preferable that the ratio of the melt viscosity (η1) measured at a shear rate of 100 sec$^{-1}$ or 1000 sec$^{-1}$ at a temperature at which anisotropic melt phase begins to be formed (flow temperature) and the melt viscosity (η2) measured at the same shear rate as in η1 at a temperature higher than the flow temperature by 20° C. or more (η2/η1) is from 0.20 to 0.80 (more preferably from 0.25 to 0.70) and higher than that (0.16 or less) of a conventional aromatic liquid crystalline polyester. In this aromatic liquid crystalline polyester of the present invention, the temperature dependency of melt viscosity is small and molding stability in processing tends to be improved.

One preferable embodiment of the present invention is a film obtained by melt extruding a liquid crystalline polyester which comprises from 65 mol % to 25 mol % of the repeating unit (A) and from 35 mol % to 75 mol % of the repeating unit (B), has a flow temperature of 300° C. or less, a logarithmic viscosity of 4.0 dl/g or more, and the ratio of viscosity (viscosity 2/viscosity 1) of 0.20 to 0.80, here the viscosity 1 is a melt viscosity measured at a flow temperature with the shear rate of 100 sec$^{-1}$ or 1000 sec$^{-1}$, and the viscosity 2 is a melt viscosity measured at a flow temperature higher than said flow temperature by 20° C. with the same shear rate as that in the melt viscosity at the flow temperature.

Also preferable is a film obtained by melt extruding a liquid crystalline polyester which comprises from 65 mol % to 25 mol % of the repeating unit (A) and from 35 mol % to 75 mol % of the repeating unit (B), has a flow temperature of 300° C. or less, and exhibits a melt tension measured at a temperature higher than the flow temperature by 25° C. or more of 3.0 g or more, and winding speed at breakage of 10 m/min or more.

These aromatic liquid crystalline polyesters can be molded to form thin blown film at a temperature higher than the flow temperature by 60° C. or less.

The resulted film has an oxygen permeability in terms of film thickness of 25 μm (measured at a temperature of 23° C., and a relative humidity of 60%) is 0.5 cc/m²·24 hr·atm or less, and a water vapor permeability in terms of film thickness of 25 μm (measured at a temperature of 40° C. and a relative humidity of 90%) is 0.5 g/m²·24hr or less. The film is excellent in gas barrier properties (oxygen barrier property and water vapor barrier property).

Further, the present invention relates to a film obtained by melt extruding an aromatic liquid crystalline polyester which comprises from more than 65 mol % to 80 mol % of the repeating unit (A) and from less than 35 mol % to 20 mol % of the repeating unit (B), has a flow temperature of 300° C. or less, a logarithmic viscosity of 6.0 dl/g or more, and the ratio of viscosity (viscosity 2/viscosity 1) of 0.20 or more, and preferably 0.40 or more (the viscosity 1 is a melt viscosity measured at a flow temperature with the shear rate of 100 sec−1, and the viscosity 2 is a melt viscosity measured at a flow temperature higher than said flow temperature by 20° C. with the same shear rate as that in the melt viscosity at the flow temperature), and exhibits a melt tension measured at a temperature higher than the flow temperature by 40° C. or more of 3.0 g or more, preferably 4.0 g or more, more preferably 6.0 g or more, and further preferably 12.0 g or more.

The upper limit of the melt tension is preferably 30.0 g, more preferably 25.0 g. The winding speed at breakage obtained during the melt tension measurement, is usually 5 to 200 m/min, preferably 5 to 100 m/min, and more preferably 10 to 80 m/min. Although it depends on the composition of the aromatic liquid crystalline polyester, when the melt tension is less than 4.0 g, the stable temperature region of blown film forming often becomes narrow. In view of film forming property, those having small temperature dependency of melt tension are preferable.

The aromatic liquid crystalline polyester of the present invention exhibits small temperature dependency of melt viscosity and tends to show wide molding processing temperature range, and the melt tension thereof can be increased without increasing the molding processing temperature. Thus, it is possible to mold a blown film of aromatic liquid crystalline polyester at a low shear rate of 500 sec$^{-1}$ or less. It is also possible to mold a blown film at a temperature higher than the flow temperature of the aromatic liquid crystalline polyester by 20° C. or less. The film thereof has a sufficient strength and excellent gas barrier properties as a wrapping material.

The form of the aromatic liquid crystalline polyester used in the present invention in usual molding processing is powder or pellet (granulated pellet) obtained after granulation of the resin in heat-melted condition by a twin screw extruder and the like, and granulated pellet is more preferable.

The flow temperature (FT1) of a pellet after granulation of the aromatic liquid crystalline polyester of the present invention reveals tendency to decrease than the flow temperature (FT0) in powder stage (advanced polymer). This tendency is larger as compared with a conventional aromatic liquid crystalline polyester using solid phase polymerization method. The reason for this difference is believed to difference in crystallinity and the like due to difference of aromatic dicarboxylic acid composition ratio and solid phase polymerization conditions. It is preferable that FT1 is lower than [FT0–5]° C. and further preferably lower than [FT0–10]° C., for lowering molding temperature of the aromatic liquid crystalline polyester and increasing molding processability.

For granulating an aromatic liquid crystalline polyester into pellet under heat-melted condition, known methods can be used. There is also a method in which a resin is fed in a molten state from a polymerization vessel to slotted parallel rollers, shaped into a strand (string), and the strand is cut by a strand cutter and the like. For granulating an aromatic liquid crystalline polyester powder to produce pellet, a resin is melted and kneaded using single or twin screw extruder usually used, cooled in air or if required cooled with water, then, the resin is shaped into pellet by a pelletizer (strand cutter) usually used. Since uniform melting and shaping are objects, a general purpose kneading machine, preferably having large L/D, can be used.

In conducting melt-kneading, the set temperature of a cylinder of a kneading apparatus (die head temperature) is preferably in the range from 200 to 350° C., more preferably from 230 to 330° C., and further preferably from 240 to 320° C.

An inorganic filler can be optionally added to the aromatic liquid crystalline polyester used in the present invention. Examples of such inorganic filler include calcium carbonate, talc, clay, silica, magnesium carbonate, barium sulfate, titanium oxide, alumina, gypsum, glass flake, glass fiber, carbon fiber, alumina fiber, silica alumina fiber, aluminum borate whisker, potassium titanate fiber and the like. These inorganic fillers can be used in the range which does not remarkably damage transparency and mechanical strength of a film.

If necessary, various additives such as an organic filler, antioxidant, heat stabilizer, optical stabilizer, flame retardant, lubricant, antistatic agent, inorganic or organic coloring agent, preservative, crosslinking agent, foaming agent, fluorescent agent, surface smoothing agent, surface gloss improver, releasing improver like a fluorine resin, and the like can be further added, during production process or in a later processing process, to the aromatic liquid crystalline polyester used in the present invention.

Formation of a film made of an aromatic liquid crystalline polyester in the present invention is not particularly restricted and can be conducted easily by a well-known method. For example, a film can be obtained by a T die method in which a melted resin is extruded through a T die and wound, or an blown film forming method in which a melted resin is extruded in cylindrical form through an extruder equipped with an annular dice, cooled, and wound, or a film can also be obtained by further drawing uniaxially a sheet obtained by an injection molding method or an extrusion method.

As a further suitable molding (film forming) method of the aromatic liquid crystalline polyester film, an blown film forming method is described. Namely, the aromatic liquid crystalline polyester is fed to a melt-kneading extruder equipped with a die having annular slit, and melt-kneading is conducted at a cylinder set temperature of 200 to 320° C., preferably 210 to 310° C., further preferably 220 to 310° C. to extrude a cylindrical film upward or downward through the annular slit of the extruder. The clearance of the annular slit is usually from 0.25 to 2 mm, preferably from 0.5 to 1.5 mm, and more preferably 0.7 to 1.2 mm, and the diameter of the annular slit is usually from 20 to 1000 mm, preferably from 25 to 600 mm.

Draft is applied to the melt extruded cylindrical melted resin film in longitudinal direction (MD), and at the same time, the film is expanded in transverse direction (TD) which is perpendicular to the longitudinal direction by blowing air or inert gas, for example, a nitrogen gas from inside of the cylindrical film.

In the blown film forming of an aromatic liquid crystalline polyester in the present invention, preferable TD drawing magnification, namely, blow up ratio is from 1.5 to 15, and further preferably from 2.5 to 15. Preferable MD drawing magnification, namely, drawdown ratio is from 1.5 to 60, and further preferably from 2.5 to 50. Wherein, the blow up ratio is (diameter of a cylindrical film)/(diameter of a dice), and the drawdown ratio is (surface area of an annular slit)/(sectional area of a film). When setting conditions in blown film forming are outside the above-described ranges, it is difficult to obtain and aromatic liquid crystalline polyester film which has uniform thickness, has no wrinkle and has suitable strength.

The shear rate during film formation is calculated by the known method (for example, JP-A No.2-3430), and preferably 50 to 500 sec$^{-1}$, more preferably 60 to 400 sec$^{-1}$, and further preferably 70 to 300 sec$^{-1}$.

The circumference of the expanded film is usually cooled with air or inert gas, for example, a nitrogen gas and the like, then, taken-up through nip rolls. In blown film molding, such conditions can be selected that a cylindrical melted film is expanded to have uniform thickness and smooth surface, depending on the composition of the aromatic liquid crystalline polyester.

The thickness of an aromatic liquid crystalline polyester film in the present invention is not particularly restricted, and preferably from 1 to 500 μm, more preferably from 5 to 200 μm, further preferably from 5 to 50 μm. Furthermore, a film having a thickness of 25 μm or less can be obtained.

EXAMPLES

The present invention will be further illustrated by examples, but the scope of the present invention is not limited by them. Physical properties were measured by methods shown below respectively.

Measuring Methods of Physical Properties

Flow temperature (FT): It is an index showing melt-flowability, and represents a temperature (° C.) at which the melt viscosity measured by a capillary type rheometer (Koka Flow Tester CFT-500 manufactured by Shimadzu Corp.) is 48,000 poise (correspond to 4800 Pa.S) when a sample resin (about 2 g) which has been melted by heating at a temperature raising rate of 4° C./min is extruded through a nozzle having an internal diameter of 1 mm and a length of 10 mm under a load of 100 kgf/cm$^2$.

Melt viscosity: About 10 g of a sample was charged into Capirograph 1B type (manufactured by Toyo Seiki Seisaku-sho, Ltd. ) using a capillary having an internal diameter of 0.5 mm and a length of 10 mm, and melt-viscosity was measured at a given temperature with a given shear rate (100 sec$^{-1}$, 1000 sec$^{-1}$).

Melt tension (melt tensile force): About 10 g of a sample was charged into Capirograph 1B type (manufactured by Toyo Seiki Seisaku-sho, Ltd.) and the sample was taken-up in string form using a capillary having an internal diameter of 2.095 mm and a length of 8.0 mm at an extruding rate of a piston of 5.0 mm/min with raising temperature automatically by a speed changeable winding machine, and tension (g) and winding up speed (m/minute) at breakage was measured.

Optical anisotropy: A sample resin powder having a particle size of 250 μm or less placed on a heating stage was heated at a rate of 25° C./min under polarized light, and optical anisotropy of the sample resin in a molten state was observed visually or with recording the amount of permeated light by an XY recorder.

Oxygen permeability: It was measured according to JIS K7126 method B (isobaric method)at a temperature of 23.5° C., and a relative humidity of 60±5% by OX-TRAN2/20 type (Modern Control Corp.). The unit is cc/m$^2$·24 hr·atm.

Water vapor permeability: It was measured according to JIS Z0208 (cup method) at a temperature of 40° C. and a relative humidity of 90%. The unit is g/m$^2$·24 hr.

The oxygen gas permeability and the water vapor permeability were calculated in terms of a film thickness of 25 μm.

Shear rate $\dot{\gamma}$ (unit, sec$^{-1}$): Calculated according to the formula, $$\dot{\gamma}=6Q/((\omega L 2\rho)$$

In the formula, Q is output amount (g/sec), ω is die width (cm), L is die gap (cm), and ρ is density of aromatic liquid crystalline polyester (g/cm$^2$).

Example 1

(1) Melt-polymerization

A 3 liter four-necked separable flask carrying a Y shape connecting tube equipped with a Dimroth condenser, a nitrogen introducing tube and a thermocouple for measuring inner temperature, an having an anchor shape stirring blade and having a thermocouple also outside the flask was used, into this polymerization vessel were charged 1207.3 g (8.74 mol) of 4-hydroxybenzoic acid, 608.4 g (3.23 mol) of 6-hydroxy-2-naphtoic acid, and 1345 g (13.2 mol) of acetic anhydride, and the outer temperature of the flask was raised to 150° C. with a mantle heater under nitrogen flow, and acetylation reaction was conducted for about 3 hours under reflux with stirring at 200 rpm. Following the acetylation reaction, the temperature was raised at a rate of 1° C./min and kept at 310° C. to conduct melt-polycondensation. Acetic acid by-produced during the polycondensation reaction was removed continuously. On the way of the polymerization, sampling was conducted at 30 minutes after reaching to 310° C., and the flow temperature was measured to be 230° C. At 35 minutes after reaching to 310° C., the stirring was terminated, and the polymer could be easily discharged in a molten state and there was little adhesion to the polymerization vessel and the stirring blade. The resulted polyester was solidified in a meanwhile. The yield was 1565 g (97.8% based on theoretical yield).

The resulted polyester was cut into about 3 to 5 cm squares, then, pulverized into particles having an average particle size of 1 mm or less using a grinding machine, then, the flow temperature (FT) was measured to 239° C. This polymer (prepolymer) exhibited optical anisotropy in molten state.

(2) Solid Phase Polymerization

This prepolymer was placed on an aluminum tray which was charged into a furnace in nitrogen atmosphere, heated from room temperature to 180° C. over 3 hours under nitrogen atmosphere and kept for 2 hours at the temperature, and further heated up to 270° C. over about 7.5 hours and kept for 5 hours at the temperature, then, cooled and taken out to obtain a polymer of an aromatic liquid crystalline polyester having a FT of 287° C. (advanced polymer). In this stage, weight reduction was 1.5%.

(3) Granulation

The resulted advanced polymer was melt-kneaded by a PCM-30 twin screw extruder manufacture by Ikegai Corp. at a die head temperature of 300° C. and a screw rotation of 80 rpm to obtain an aromatic liquid crystalline polyester pellet having a FT of 264° C. The melt tension of this resin pellet at 295° C. (FT+31° C.) was 7.7 g, and the logarithmic viscosity (ηinh) measured at 60° C. was 5.5 dl/g. The melt-viscosity is shown in Table 1.

Example 2

(1) Melt-polymerization

According to the same procedure as in Example 1(1), melt-polymerization was conducted. 1207.3 g (8.74 mol) of 4-hydroxybenzoic acid, 608.4 g (3.23 mol) of 6-hydroxy-2-naphtoic acid, and 1345 g (13.2 mol) of acetic anhydride were charged, and acetylation reaction (150° C., about 3 hours under reflux) was conducted, then the temperature was raised at a rate of 1° C./min and kept at 310° C. to conduct melt-polycondensation with removing by-produced acetic acid continuously. 15 minutes after reaching to 310° C., the stirring was terminated, and the polymer could be easily discharged in a molten state and there was little adhesion to the polymerization vessel and the stirring blade. The resulted polyester was solidified in a meanwhile. The yield was 1570 g (98.1% based on theoretical yield).

The resulted polyester was cut into about 3 to 5 cm squares, then, pulverized into particles having an average particle size of 1 mm or less using a grinding machine, then, the flow temperature (FT) was measured to 210° C. This polymer (prepolymer) exhibited optical anisotropy in molten state.

(2) Solid Phase Polymerization

Solid phase polymerization was conducted as the same condition with Example 1(2). After cooling, powder of an aromatic liquid crystalline polyester having a FT of 288° C. (advanced polymer) was obtained. In this stage, weight reduction was 3.3%.

(3) Granulation

The resulted advanced polymer was melt-kneaded using the same extruder as Example 1(3) at a die head temperature of 300° C. and a screw rotation of 80 rpm to obtain an aromatic liquid crystalline polyester pellet having a FT of 265° C. The melt tension of this resin pellet at 305° C. (FT+40° C.) was 9.1 g, and the logarithmic viscosity (ηinh) measured at 60° C. was 5.6 dl/g. The melt-viscosity is shown in Table 1.

Example 3
(1) Melt-polymerization

According to the same procedure as in Example 1(1), melt-polymerization was conducted. 1207.3 g (8.74 mol) of 4-hydroxybenzoic acid, 608.4 g (3.23 mol) of 6-hydroxy-2-naphtoic acid, and 1345 g (13.2 mol) of acetic anhydride were charged, and acetylation reaction (150° C., about 3 hours under reflux) was conducted, then the temperature was raised at a rate of 1° C./min and kept at 310° C. to conduct melt-polycondensation with removing by-produced acetic acid continuously. 60 minutes after reaching to 310° C., the polymer sample showed a flow temperature of 246° C. 90 minutes after reaching to 310° C., the stirring was terminated, and the polymer could be easily discharged in a molten state and there was little adhesion to the polymerization vessel and the stirring blade. The resulted polyester was solidified in a meanwhile. The yield was 1573 g (98.3% based on theoretical yield).

The same procedures were conducted 7 times repeatedly, the resulted polyester was cut into about 3 to 5 cm squares, then, pulverized into particles having an average particle size of 1 mm or less using a grinding machine, then, the flow temperature (FT) was measured to 248° C. This polymer (prepolymer) exhibited optical anisotropy in molten state.

(2) Solid Phase Polymerization

Solid phase polymerization was conducted as the same condition with Example 1(2) except that the prepolymer was placed on an aluminum tray, and heated from room temperature to 180° C. over 3 hours under nitrogen atmosphere and kept for 2 hours at the temperature, and further heated up to 280° C. over about 8.3 hours and kept for 5 hours at that temperature. After cooling, powder of an aromatic liquid crystalline polyester having a FT of 357° C. (advanced polymer) was obtained. In this stage, weight reduction was 1.2%.

(3) Granulation

The resulted advanced polymer was melt-kneaded using the same extruder as Example 1(3) at a die head temperature of 340° C. and a screw rotation of 100 rpm to obtain an aromatic liquid crystalline polyester pellet having a FT of 277° C. The melt tension of this resin pellet at 307C (FT+30° C.) was 22.7 g, and the logarithmic viscosity (ηinh) measured at 60° C. was 11.1 dl/g. The melt-viscosity is shown in Table 1.

Example 4
(1) Melt-polymerization

According to the same procedure as in Example 1(1), melt-polymerization was conducted. 428.8 g (3.10 mol) of 4-hydroxybenzoic acid, 1359.7 g (7.20 mol) of 6-hydroxy-2-naphtoic acid, and 1159.7 g (11.4 mol) of acetic anhydride were charged, and acetylation reaction (150° C., about 3 hours under reflux) was conducted, then the temperature was raised at a rate of 1° C./min and kept at 320° C. to conduct melt-polycondensation with removing by-produced acetic acid continuously. 45 minutes after keeping at 320° C., the stirring was terminated, and the polymer could be easily discharged in a molten state. FT of the resulted polyester was 247° C. and exhibited optical anisotropy in molten state. The yield was 1557 g (97.2% based on theoretical yield).

(2) Solid Phase Polymerization

Solid phase polymerization was conducted as the same condition with Example 1(2) except that the prepolymer was placed on an aluminum tray, and heated from room temperature to 208° C. over 3 hours and further heated up to 260° C. over about 8 hours and 40 minutes and kept for 5 hours at that temperature. Powder of an aromatic liquid crystalline polyester having a FT of 281° C. (advanced polymer) was obtained. In this stage, weight reduction was 1.0%.

(3) Granulation

The resulted advanced polymer was melt-kneaded using the same extruder as Example 1(3) at a die head temperature of 310° C. and a screw rotation of 150 rpm to obtain an aromatic liquid crystalline polyester pellet having a FT of 260° C. The melt tension of this resin pellet at 290° C. (FT+30° C.) was 4.7 g, at which the winding up speed was 19.7 m/minute. The logarithmic viscosity (ηinh) measured at 60° C. was 4.4 dl/g. The melt-viscosity is shown in Table 1.

Example 5
(1) Melt-Polymerization

According to the same procedure as in Example 4(1), melt-polymerization was conducted. 947.0 g (6.9 mol) of 4-hydroxybenzoic acid, 860.3 g (4.6 mol) of 6-hydroxy-2-naphtoic acid, and 1283.7 g (12.6 mol) of acetic anhydride were charged, and acetylation reaction (150° C., about 3 hours under reflux) was conducted, then the temperature was raised at a rate of 1° C./min and kept at 320° C. to conduct melt-polycondensation with removing by-produced acetic acid continuously. 45 minutes after keeping at 320° C., the stirring was terminated, and the polymer could be easily discharged in a molten state. FT of the resulted polyester was 216° C. and exhibited optical anisotropy in molten state. The yield was 1563 g (97.7% based on theoretical yield).

(2) Solid Phase Polymerization

Solid phase polymerization was conducted as the same condition with Example 1(2) except that the prepolymer was placed on an aluminum tray, and heated from room temperature to 190° C. over 3 hours and further heated up to 240° C. over about 8 hours and 20 minutes and kept for 5 hours at that temperature. Powder of an aromatic liquid crystalline polyester having a FT of 240° C. (advanced polymer) was obtained. In this stage, weight reduction was 0.9%.

(3) Granulation

The resulted advanced polymer was melt-kneaded using the same extruder as Example 1(3) at a die head temperature of 280° C. and a screw rotation of 150 rpm to obtain an aromatic liquid crystalline polyester pellet having a FT of 230° C. The melt tension of this resin pellet at 260° C. (FT+30° C.) was 3.0 g, at which the winding up speed was 22.3 m/minute. The logarithmic viscosity (ηinh) measured at 60° C. was 4.9 dl/g. The melt-viscosity is shown in Table 1.

Comparative Example 1
(1) Polymerization at Reduced Pressure 1208.9 g (8.76 mol) of 4-hydroxybenzoic acid, 609.1 g (3.24 mol) of 6-hydroxy-2-naphtoic acid, and 1346.4 g (13.21 mol) of acetic anhydride were charged into a polymerization vessel having a comb-type stirring blade. and the temperature was raised to 150° C. under nitrogen flow, and acetylation reaction was conducted for about 3 hours under reflux with stirring. Following the acetylation reaction, the temperature was raised at a rate of 1° C./min and kept the outer temperature of the polymerization vessel at 330° C. to conduct melt-polycondensation with removing continuously by-produced acetic acid during the polycondensation reaction. Next, keeping the outer temperature of the polymerization vessel at 330° C., operation of reducing pressure was conducted to the final pressure over 40 minutes, and having kept the pressure at 2 torr for 5 minutes, the stirring was terminated, and the polymer was discharged. There recognized polymerized adhesives to the polymerization vessel and the stirring blade.

The yield was 1551 g (97.1% based on theoretical yield). The obtained polymer was pulverized using a grinding machine, but pulverizing speed was slower than that of Example 1, due to fiberization. For the powders having passed through a filter of average particle size of 3 mm or less, the flow temperature (FT) was measured to 261° C.

(3) Granulation

The resulted advanced polymer was melt-kneaded using the same extruder as Example 1(3) at a die head temperature of 260° C. and a screw rotation of 80 rpm to obtain an aromatic liquid crystalline polyester pellet having a FT of 263° C. The melt tension of this resin pellet at 305° C. (FT+42° C.) was 2.8 g, and the logarithmic viscosity ($\eta$ inh) measured at 60° C. was 5.5 dl/g. The melt-viscosity is shown in Table 1.

TABLE 1

| | | 100 sec$^{-1}$ | | | 1000 sec$^{-1}$ | | |
|---|---|---|---|---|---|---|---|
| | FT (° C.) | $\eta$ 1 FT | $\eta$ 2 FT + 20 | $\eta$ 2/ $\eta$ 1 | $\eta$ 1 FT | $\eta$ 2 FT + 20 | $\eta$ 2/ $\eta$ 1 |
| Example 1 | 264 | 46340 | 19630 | 0.42 | 9308 | 4289 | 0.46 |
| Example 2 | 265 | 46940 | 19360 | 0.41 | 9725 | 4289 | 0.44 |
| Example 3 | 277 | 49080 | 20730 | 0.42 | 12370 | 5456 | 0.44 |
| Example 4 | 260 | 43600 | 14100 | 0.32 | 6940 | 2880 | 0.42 |
| Example 5 | 230 | 56600 | 18400 | 0.33 | 9420 | 2570 | 0.27 |
| Comparative Example 1 | 263 | 56000 | 9200 | 0.09 | 4900 | 1500 | 0.16 |

Example 6

(4) Blown Film Formation

The aromatic liquid crystalline polyester pellet obtained in Example 4 was made into a film using a Labo Plasto mill (manufactured by Toyo Seiki Seisaku-sho Ltd.) to which a twin screw extruder having a diameter of 30 mm ø had been installed and onto head portion of which a blown film die having a diameter of 25 mm φ and a die gap of 0.75 mm had been mounted, at a cylinder setting temperature of 260–300° C., screw rotation speed of 100 rpm, a die head setting temperature of 320° C. and a winding up speed of 15 m/min, to obtain a film having a folding width of 205 mm. Bubble formation was stable, and the thickness of film was about 15 to 25 $\mu$m, and the appearance of film was comparatively good. In table 3, calculated blow up ratio, drawdown ratio, TD/MD, output amount, and shear rate are shown.

(5) Measurement of Gas Barrier Property

Oxygen gas barrier property (oxygen permeability) of the film having a thickness of 25 $\mu$m was 0.35 cc/m$^2$·24 hr·atm.

Water vapor barrier property (water vapor permeability) was 0.17 g/m$^2$·24 hr.

Example 7

(4) Blown Film Formation

The aromatic liquid crystalline polyester pellet obtained in Example 5 was made into a film according to the same manner as in Example 6 (4) at a cylinder setting temperature of 240–280° C., a die head setting temperature of 280° C. and a winding up speed of 15 m/min, to obtain a film having a folding width of 120 mm. Bubble formation was stable, and the thickness of film was about 25 $\mu$m, and the appearance of film was comparatively good. In table 3, calculated blow up ratio, drawdown ratio, TD/MD, output amount, and shear rate are shown.

(5) Measurement of Gas Barrier Property

Oxygen gas barrier property (oxygen permeability) of the film having a thickness of 25 $\mu$m was 0.34 cc/m$^2$·24 hr·atm.

Water vapor barrier property (water vapor permeability) was 0.25 g/m$^2$·24 hr.

Example 8

(1) Melt-Polymerization

According to the same procedure as in Example 4(1), melt-polymerization was conducted. 1250.7 g (9.06 mol) of 4-hydroxybenzoic acid, 568.8 g (3.02 mol) of 6-hydroxy-2-naphtoic acid, and 1355.7 g (13.3 mol) of acetic anhydride were charged, and acetylation reaction (150° C., about 3 hours under reflux) was conducted, then the temperature was raised at a rate of 1° C./min and kept at 320° C. to conduct melt-polycondensation with removing by-produced acetic acid continuously. 45 minutes after keeping at 320° C., the stirring was terminated, and the polymer could be easily discharged in a molten state and there was little adhesion to the polymerization vessel and the stirring blade. The resulted polyester was solidified in a meanwhile. The yield was 1586 g (99.2% based on theoretical yield).

The same procedures were conducted 3 times repeatedly, the resulted polyester was cut into about 3 to 5 cm squares, then, pulverized into particles having an average particle size of 1 mm or less using a grinding machine, then, FT was 243° C. and exhibited optical anisotropy in molten state.

(2) Solid Phase Polymerization

Solid phase polymerization was conducted as the same condition with Example 4(2). After cooling, powder of an aromatic liquid crystalline polyester having a FT of 283° C. (advanced polymer) was obtained. In this stage, weight reduction was about 1.7%.

(3) Granulation

The resulted advanced polymer was melt-kneaded at a die head temperature of 320° C. and a screw rotation of 150 rpm to obtain an aromatic liquid crystalline polyester pellet having a FT of 272° C. The melt tension of this resin pellet at 302° C. (FT+30° C.) was 4.0 g, at which the winding up speed was 11.6 m/minute. The logarithmic viscosity ($\eta$inh) measured at 60° C. was 6.4 dl/g. The melt-viscosity is shown in Table 2.

(4) Blown Film Formation

The resulted aromatic liquid crystalline polyester pellet was made into a film according to the same manner as in Example 6(4) at a cylinder setting temperature of 270–320° C., screw rotation speed of 100 rpm, a die head setting temperature of 320° C. and an winding up speed of 15 m/min, to obtain a film having a folding width of 200 mm. Bubble formation was stable, and the thickness of film was about 25 $\mu$m, and the appearance of film was comparatively good. In table 3, calculated blow up ratio, drawdown ratio, TD/MD, output amount, and shear rate are shown.

(5) Measurement of Gas Barrier Property

Oxygen gas barrier property (oxygen permeability) of the film having a thickness of 25 $\mu$m was e 0.62 cc/m$^2$·24 hr·atm.

Water vapor barrier property (water vapor permeability) was 0.47 g/m$^2$24 hr.

TABLE 2

|  | FT (° C.) | 100 sec⁻¹ ||| 1000 sec⁻¹ |||
| --- | --- | --- | --- | --- | --- | --- | --- |
|  |  | $\eta 1$ FT | $\eta 2$ FT + 20 | $\eta 2/\eta 1$ | $\eta 1$ FT | $\eta 2$ FT + 20 | $\eta 2/\eta 1$ |
| Example 8 | 272 | 51000 | 17400 | 0.34 | 8310 | 3490 | 0.42 |

TABLE 3

|  | blow up ratio | drawdown ratio | TD/MD | output amount (kg/hr) | shear rate (sec⁻¹) |
| --- | --- | --- | --- | --- | --- |
| Example 6 | 5.2 | 9.6 | 0.54 | 5.3 | 143 |
| Example 7 | 3.1 | 9.7 | 0.32 | 7.2 | 194 |
| Example 8 | 5.0 | 5.0 | 1.0 | 8.0 | 216 |

Example 9
(4) Blown Film Formation

The aromatic liquid crystalline polyester pellet obtained in Example 3 was made into a film according to the same manner as in Example 6(4) at a cylinder setting temperature of 260–295° C., a die head temperature of 295° C. and an winding up speed of 5 m/min, to obtain a film having a folding width of 120 mm. Bubble formation was stable, and the thickness of film was 69 μm, and the appearance of film was good. Oxygen gas permeability of the film was 0.26 cc/m²·24 hr·atm.

Blown film formation was carried out with lowering the temperatures of cylinder and die head gradually, and it was found that film could be formed, as a lower limit, by a cylinder temperature of 230–245° C., and a die head temperature of 245° C., and film having a thickness of 5–70 μm was obtained. The result is shown in Table 5.

At a temperature of either 300° C. or more, or 235° C. or less, bubble formation was unstable to result the film formation impossible or the film appearance bad. Thus, it is regarded that the film formable range is about 65° C.

Comparative Example 2
(1) Polymerization at Reduced Pressure 1108.1 g (8.03 mol) of 4-hydroxybenzoic acid, 558.4 g (2.97 mol) of 6-hydroxy-2-naphtoic acid, and 1234.2 g (12.1 mol) of acetic anhydride were charged into a polymerization vessel having a comb-type stirring blade, and the temperature was raised to 150° C. under nitrogen flow, and acetylation reaction was conducted for about 3 hours under reflux with stirring. Following the acetylation reaction, the temperature was raised at a rate of 1° C./min and kept the outer temperature of the polymerization vessel at 320° C. for 1 hour. And further, keeping the outer temperature of the polymerization vessel at 320° C., operation of reducing pressure was conducted, and then the stirring was terminated, and the highly viscous polymer was discharged. There recognized polymerized adhesives to the polymerization vessel and the stirring blade. The yield was 1469 g (99.7% based on theoretical yield).

The same procedures were repeated four times and the obtained polymer was tried to be pulverized using a grinding machine, but fine pulverizing was difficult due to fiberization, and the pulverizing speed was slow. For the powders passed through a filter of average particle size of 3 mm or less, the flow temperature (FT) was measured to be 260° C.

(3) Granulation

The resulted advanced polymer was melt-kneaded by a PCM-30 twin screw extruder manufacture by Ikegai Corp. at a die head temperature of 280° C. and a screw rotation of 80 rpm to obtain an aromatic liquid crystalline polyester pellet having a FT of 255° C. The melt tension of this resin pellet at 295° C. (FT+40° C.) was 2.2 g, and the logarithmic viscosity (ηinh) measured at 60° C. was 5.1 dl/g. The melt-viscosity is shown in Table 1.

(4) Blown Film Formation

The resulted aromatic liquid crystalline polyester pellet was made into a film according to the same manner as in Example 6(4), at a cylinder temperature of 275° C., a die head temperature of 265° C., to obtain a film having a folding width of 150 mm. The bubble was comparatively stable, the thickness was 5 to 40 μm, and appearance of the film was good and no protruding portion was observed.

Blown film formation was carried out with lowering the temperatures of cylinder and die head gradually, and it was found that film formation could be conducted, as a lower limit, by a die head temperature of 265° C. The result is shown in Table 6.

At a die head temperature of either 255° C. or less, or 285° C. or more, bubble formation was unstable to result the film formation impossible or the film appearance bad. Thus, it is concluded that the film formable range is as narrow as about 30° C.

TABLE 4

|  |  | 100 sec⁻¹ |||
| --- | --- | --- | --- | --- |
|  | FT(° C.) | $\eta 1$ FT(poise) | $\eta 2$ FT + 20 (poise) | $\eta 2/\eta 1$ |
| Example 9 | 277 | 49080 | 20730 | 0.42 |
| Comparative Example 2 | 255 | 49400 | 16100 | 0.33 |

TABLE 5

| Die head temperature (° C.) | Output amount (kg/h) | blow up ratio | drawdown ratio | shear rate (sec⁻¹) | Note |
| --- | --- | --- | --- | --- | --- |
| 300 | — | — | — | — | * |
| 295 | 4.0 | 3.1 | 3.5 | 109 |  |
| ↑ | ↑ | 4.3 | 5.4 | ↑ |  |
| 285 | 3.8 | 3.7 | 11.8 | 103 |  |
| 275 | 3.8 | 4.3 | 15.3 | 103 |  |
| 265 | 3.6 | 3.7 | 13.8 | 96 |  |
| 255 | 2.9 | 3.1 | 47.5 | 79 |  |
| 245 | 1.8 | 3.3 | 25.6 | 49 |  |
| 235 | — | — | — | — | * |

* Film could not be formed.

TABLE 6

| Die head temperature (° C.) | Output amount (kg/h) | blow up ratio | drawdown ratio | shear rate (sec⁻¹) | Note |
| --- | --- | --- | --- | --- | --- |
| 285 | — | — | — | — | * |
| 280 | 10.1 | 5.2 | 10.9 | 272 |  |
| 275 | 10.2 | 5.4 | 13.9 | 275 |  |
| 265 | 10.3 | 6.1 | 13.1 | 278 |  |
| 255 | — | — | — | — | * |

* Film could not be formed.

By the process for producing a aromatic liquid crystalline polyester of the present invention, a liquid crystalline polyester having high molecular weight can be obtained stably as compared with a conventional process in which polycondensation is conducted under reduced pressure in the latter stage of the polymerization.

The aromatic liquid crystalline polyester of the present invention exhibits small temperature dependency of melt viscosity and tends to show wide molding processing temperature range, and the melt tension thereof can be increased with increasing the molecular weight. The aromatic liquid crystalline polyester has improved low temperature molding processability, and the film thereof has sufficient heat-resistance as a wrapping material, and excellent gas barrier properties, and the appearance thereof is good. Therefore, it can be used as a resin material for film such as food wrapping, drug wrapping, cosmetics wrapping, electric material wrapping and the like, a resin material for blow molding such as various containers, and a resin material for injection molding.

What is claimed is:

1. An aromatic liquid crystalline polyester prepared by a process comprising the steps of: charging 80 to 20 mol % of a compound represented by the following formula (I) and 20 to 80 mol % of a compound represented by the following formula (II) into a reaction vessel; conducting polycondensation reaction of the charged mixture at a temperature from 270 to 350° C. at normal pressure to produce an aromatic liquid crystalline polyester having a flow temperature of 210° C. or more and lower than the polycondensation reaction temperature by 30° C. or more; discharging the aromatic liquid crystalline polyester in a molten state from the reaction vessel and solidifying; then, pulverizing the solidified polyester into particles having a particle size of 3 mm or less; and heat-treating at a temperature from 200 to 310° C. still in the solid state under inert gas atmosphere,

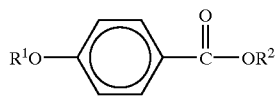 (I)

in the formula, $R^1$ represents a hydrogen atom, formyl group, acetyl group, propionyl group or benzoyl group, and $R^2$ represents a hydrogen atom, methyl group, ethyl group, propyl group, benzyl group or phenyl group,

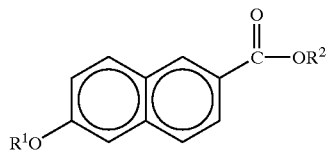 (II)

in the formula, $R^1$ and $R^2$ are the same with those defined in formula (I), $R^1$s in formulae (I) and (II) may be the same or different from each other, $R^2$s in formulae (I) and (II) may be the same or different from each other, and the flow temperature means a temperature (° C.) at which the melt viscosity measured by a capillary type rheometer is 48,000 poise when a resin which has been melted by heating at a temperature raising rate of 4° C./min is extruded through a nozzle having an internal diameter of 1 mm and a length of 10 mm under a load of 100 kgf/cm$^2$, wherein the aromatic liquid crystalline polyester comprises 80 to 20 mol % of the following repeating unit (A) and 20 to 80 mol % of the following repeating unit (B):

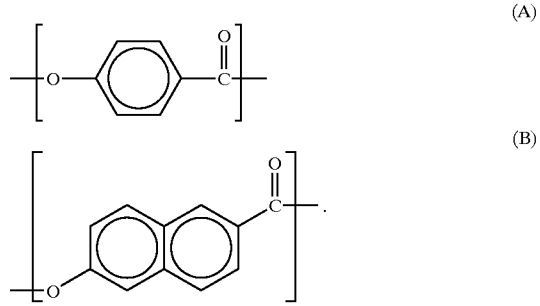

2. An aromatic liquid crystalline polyester according to claim 1, wherein the aromatic liquid crystalline polyester has a logarithmic viscosity of 4.0 dl/g or more, has a flow temperature of 320° C. or less, and exhibits a melt tension measured at a temperature higher than the flow temperature by 25° C. or more of 3.0 g or more.

3. The liquid crystalline polyester according to claim 1, wherein the ratio of viscosity (viscosity 2/viscosity 1) is 0.20–0.80, here the viscosity 1 is a melt viscosity measured at a flow temperature with the shear rate of 100 sec−1 or 1000 sec−1, and the viscosity 2 is a melt viscosity measured at a flow temperature higher than said flow temperature by 20° C. with the same shear rate as that in the melt viscosity at the flow temperature.

4. A film obtained by melt-extruding the liquid crystalline polyester of claim 1.

5. A film obtained by melted-extruding the liquid crystalline polyester of claim 2.

6. A film according to claim 5, wherein the ratio of viscosity (viscosity 2/viscosity 1) is 0.20–0.80, here the viscosity 1 is a melt viscosity measured at a flow temperature with the shear rate of 100 sec−1 or 1000 sec−1, and the viscosity 2 is a melt viscosity measured at a flow temperature higher than said flow temperature by 20° C. with the same shear rate as that in the melt viscosity at the flow temperature.

7. A film obtained by melt-extruding the liquid crystalline polyster of claim 3.

8. A film according to claim 4, wherein the liquid crystalline polyester comprises from more than 65 mol % to 80 mol % of the repeating unit (A) and from less than 35 mol % to 20 mol % of the repeating unit (B), has a flow temperature of 300° C. or less, a logarithmic viscosity of 6.0 dl/g or more, and the ratio of viscosity (viscosity 2/viscosity 1) of 0.20 or more, here the viscosity 1 is a melt viscosity measured at a flow temperature with the shear rate of 100 sec−1, and the viscosity 2 is a melt viscosity measured at a flow temperature higher than said flow temperature by 20° C. with the same shear rate as that in the melt viscosity at the flow temperature, and exhibits a melt tension measured at a temperature higher than the flow temperature by 40° C. or more of 3.0 g or more.

9. A film according to claim 4, wherein the liquid crystalline polyester comprises from 65 mol % to 25 mol % of the repeating unit (A) and from 35 mol % to 75 mol % of the repeating unit (B), has a flow temperature of 300° C. or less, a logarithmic viscosity of 4.0 dl/g or more, and the ratio of viscosity (viscosity 2/viscosity 1) of 0.20 to 0.80, here the viscosity 1 is a melt viscosity measured at a flow temperature with the shear rate of 100 sec$^{-1}$ or 1000 sec$^{-1}$, and the viscosity 2 is a melt viscosity measured at a flow temperature higher than said flow temperature by 20° C. with the same shear rate as that in the melt viscosity at the flow temperature.

10. A film according to claim 4, wherein the liquid crystalline polyester comprises from 65 mol % to 25 mol % of the repeating unit (A) and from 35 mol % to 75 mol % of the repeating unit (B), has a flow temperature of 300° C. or less, and exhibits a melt tension measured at a temperature higher than the flow temperature by 25° C. or more of 3.0 g or more, and winding speed at breakage of 10 m/min or more.

11. A film according to claim 9, wherein the liquid crystalline polyester has a melt tension measured at a temperature higher than the flow temperature by 25° C. or more of 3.0 g or more.

* * * * *